(12) United States Patent
Chanda et al.

(10) Patent No.: US 10,930,176 B2
(45) Date of Patent: Feb. 23, 2021

(54) BIOFIDELIC CONDUCTIVE SKIN SIMULANT

(71) Applicant: The Board of Trustees of The University of Alabama, Tuscaloosa, AL (US)

(72) Inventors: Arnab Chanda, Tuscaloosa, AL (US); Vinu Unnikrishnan, Tuscaloosa, AL (US); Kim Lackey, Northport, AL (US); Joseph Robbins, Cottondale, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 0 days.

(21) Appl. No.: 16/106,934

(22) Filed: Aug. 21, 2018

(65) Prior Publication Data

US 2019/0057624 A1    Feb. 21, 2019

Related U.S. Application Data

(60) Provisional application No. 62/548,151, filed on Aug. 21, 2017.

(51) Int. Cl.
| | |
|---|---|
| *G09B 23/30* | (2006.01) |
| *C08K 3/04* | (2006.01) |
| *C08K 7/06* | (2006.01) |
| *C08L 83/04* | (2006.01) |
| *C08K 3/08* | (2006.01) |

(52) U.S. Cl.
CPC ............... *G09B 23/30* (2013.01); *C08K 3/04* (2013.01); *C08K 7/06* (2013.01); *C08L 83/04* (2013.01); *C08K 3/08* (2013.01); *C08K 2201/001* (2013.01); *C08K 2201/004* (2013.01); *C08L 2203/02* (2013.01); *C08L 2203/12* (2013.01); *C08L 2205/16* (2013.01)

(58) Field of Classification Search
CPC ..... G09B 23/30; C08L 83/04; C08L 2203/12; C08L 2203/02; C08K 2201/004
USPC ........ 252/500, 502, 503, 510, 511; 525/447; 434/262, 267
See application file for complete search history.

(56) References Cited

U.S. PATENT DOCUMENTS

| | | | |
|---|---|---|---|
| 4,481,001 | A | 11/1984 | Graham et al. |
| 5,312,755 | A | 5/1994 | Madsen et al. |
| 6,136,039 | A | 10/2000 | Kristinsson et al. |
| 7,222,525 | B1 | 5/2007 | Jones |

(Continued)

FOREIGN PATENT DOCUMENTS

| | | | |
|---|---|---|---|
| WO | 20130171444 | 11/2013 | |
| WO | WO2017114440 A1 * | 7/2017 | ............ C08L 83/07 |

OTHER PUBLICATIONS

Dąbrowska "Materials used to simulate physical properties of human skin." Skin Research and Technology 2016; 22: 3-14 (Year: 2016).*

(Continued)

*Primary Examiner* — Tri V Nguyen
(74) *Attorney, Agent, or Firm* — Meunier Carlin & Curfman LLC (57) ABSTRACT

Described are biofidelic conductive skin simulants closely mimicking the biomechanical properties of natural human skin, including vaginal skin tissue. The conductive simulant contains a siloxane network and conductive fibers.

10 Claims, 3 Drawing Sheets

(56) References Cited

U.S. PATENT DOCUMENTS

| | | | |
|---|---|---|---|
| 7,462,488 | B2 | 12/2008 | Madsen et al. |
| 8,215,165 | B2 | 7/2012 | Giurintano et al. |
| 9,123,261 | B2 | 9/2015 | Lowe |
| 2007/0116766 | A1 | 5/2007 | Amick |
| 2010/0167254 | A1 | 7/2010 | Nguyen |
| 2011/0207104 | A1 | 8/2011 | Trotta et al. |
| 2012/0015337 | A1 | 1/2012 | Hendrickson et al. |
| 2013/0085736 | A1* | 4/2013 | Reihsen ............... G16H 50/50 703/11 |
| 2013/0192741 | A1 | 8/2013 | Trotta et al. |
| 2017/0011657 | A1 | 1/2017 | Chanda et al. |

OTHER PUBLICATIONS

Abas, W.W. and J. Barbenel, Uniaxial tension test of human skin in vivo. Journal of biomedical engineering, 1982. 4(1): p. 65-71.

Agache, P., et al., Mechanical properties and Young's modulus of human skin in vivo. Archives of dermatological research, 1980. 269(3): p. 221-232.

Annaidh, A.N., et al., Characterization of the anisotropic mechanical properties of excised human skin. Journal of the mechanical behavior of biomedical materials, 2012. 5(1): p. 139-148.

Bir, C.A., M. Resslar, and S. Stewart, Skin penetration surrogate for the evaluation of less lethal kinetic energy munitions. Forensic science international, 2012. 220(1): p. 126-129.

Boyer, G., et al. In vivo characterization of viscoelastic properties of human skin using dynamic micro-indentation. in Engineering in Medicine and Biology Society, 2007. EMBS 2007. 29th Annual International Conference of the IEEE. 2007. IEEE.

Chanda, A. and H. Ghoneim, Pumping potential of a two-layer left-ventricle-like flexible-matrix-composite structure. Composite Structures, 2015. 122: p. 570-575.

Chanda, A. and V. Unnikrishnan. Human Tissue Simulants for Study of Traumatic Brain Injury (TBI). in Proceedings of the American Society for Composites: Thirty-First Technical Conference. 2016, 11 pages.

Chanda, A., et al., Biofidelic human brain tissue surrogates. Mechanics of Advanced Materials and Structures, 2016, 7 pages.

Chanda, A., et al., Computational Modeling of the Female Pelvic Support Structures and Organs to Understand the Mechanism of Pelvic Organ Prolapse: A Review. Applied Mechanics Reviews, 2015. 67(4): p. 040801.

Cook, T., H. Alexander, and M. Cohen, Experimental method for determining the 2-dimensional mechanical properties of living human skin. Medical and Biological Engineering and Computing, 1977. 15(4): p. 381-390.

De Rossi, D., A. Della Santa, and A. Mazzoldi, Dressware: wearable hardware. Materials Science and Engineering: C, 1999. 7(1): p. 31-35.

Delalleau, A., et al., A nonlinear elastic behavior to identify the mechanical parameters of human skin in vivo. Skin Research and Technology, 2008. 14(2): p. 152-164.

Douven, L.F., R. Meijer, and C.W. Oomens. Characterization of mechanical behavior of human skin in vivo. In BiOS 2000 the International Symposium on Biomedical Optics. 2000. International Society for Optics and Photonics.

Durometer Shore Hardness Scale from Smooth-On, https://www.smooth-on.com/page/durometer-shore-hardness-scale/ Accessed Nov. 22, 2016.

Edwards, C. and R. Marks, Evaluation of biomechanical properties of human skin. Clinics in dermatology, 1995. 13(4): p. 375-380.

Finlay, B., Dynamic mechanical testing of human skin 'in vivo'. Journal of biomechanics, 1970. 3(6): p. 557-568.

Gallagher, A., A. Ní Annaidh, and K. Bruyère. Dynamic tensile properties of human skin. in 2012 IRCOBI Conference Proceedings. 2012. International Research Council on the Biomechanics of Injury.

Gonzalez, L.Y.S., M.G. Botero, and M. Betancur, Hyperelastic Material Modeling. 2005, Universidad EAFIT: Medell'in, Colombia.

Heinrich, T. and R.A. Lunderstaedt. Quantification of mechanical properties of human skin in vivo. in International Symposium on Optical Science and Technology. 2001. International Society for Optics and Photonics.

Hendriks, F. Mechanical behaviour of human skin in vivo—a literature review. in Nat. Lab. Unclassified Report 820. Philips Research Laboratories. 2001. Citeseer. 52 pages.

Hendriks, F., et al., Mechanical Properties of Different Layers of Human Skin. Internal Poster (http://yp.bmt.tue.nl/pdfs/249.pdf), Department of Biomedical Engineering, Eindhoven University of Technology, 2000, 1 page.

Jussila, J., et al., Ballistic skin simulant. Forensic science international, 2005. 150(1): p. 63-71.

Kathirgamanathan, P., Curable electrically conductive resins with polyaniline fillers. Polymer, 1993. 34(13): p. 2907-2908.

Kremer, E. Lang, and A. Berger, "Organotypical engineering of differentiated composite-skin equivalents of human keratinocytes in a collagen-GAG matrix (INTEGRA Artificial Skin) in a perfusion culture system," Langenbeck's Archives of Surgery, vol. 386, pp. 357-363, 2001.

Kvistedal, Y. and P. Nielsen. Investigating stress-strain properties of in-vivo human skin using multiaxial loading experiments and finite element modeling. in Engineering in Medicine and Biology Society, 2004. IEMBS'04. 26th Annual International Conference of the IEEE. 2004. IEEE.

Lualdi, M., et al., A phantom with tissue-like optical properties in the visible and near infrared for use in photomedicine. Lasers in surgery and medicine, 2001. 28(3): p. 237-243.

Manschot, J. and A. Brakkee, The measurement and modelling of the mechanical properties of human skin in vivo—II. The model. Journal of Biomechanics, 1986. 19(7): p. 517-521.

Manschot, J.F.M., The mechanical properties of human skin in vivo. Journal of Biomechanics, 1985. 19: p. 511-515.

Martins, P., R. Natal Jorge, and A. Ferreira, A Comparative Study of Several Material Models for Prediction of Hyperelastic Properties: Application to Silicone-Rubber and Soft Tissues. Strain, 2006. 42(3): p. 135-147.

McGrath, J. and J. Uitto, Anatomy and organization of human skin. Rook's Textbook of Dermatology, Eighth Edition, 2010: p. 1-53.

Pailler-Mattei, C., S. Bec, and H. Zahouani, In vivo measurements of the elastic mechanical properties of human skin by indentation tests. Medical engineering & physics, 2008. 30(5): p. 599-606.

Payne et al., "Development of novel synthetic muscle tissues for sports impact surrogates" Journal of the Mechanical Behavior of Biomedical Materials, vol. 41, 2015, pp. 357-374.

Payne, T., et al., Initial validation of a relaxed human soft tissue simulant for sports impact surrogates. Procedia engineering, 2014. 72: p. 533-538.

Payne, T., et al., the evaluation of new multi-material human soft tissue simulants for sports impact surrogates. Journal of the mechanical behavior of biomedical materials, 2015. 41: p. 336-356.

Payne, T., S. Mitchell, and R. Bibb, Design of human surrogates for the study of biomechanical injury: a review. Critical Reviews™ in Biomedical Engineering, 2013. 41(1).

Potts, R.O., D.A. Chrisman, and E.M. Buras, The dynamic mechanical properties of human skin in vivo. Journal of biomechanics, 1983. 16(6): p. 365-372.

Sasso, G. Palmieri, G. Chiappini, and D. Amodio, "Characterization of hyperelastic rubber-like materials by biaxial and uniaxial stretching tests based on optical methods," Polymer Testing, vol. 27, pp. 995-1004, 2008.

Shergold, O.A., N.A. Fleck, and D. Radford, The uniaxial stress versus strain response of pig skin and silicone rubber at low and high strain rates. International Journal of Impact Engineering, 2006. 32(9): p. 1384-1402.

Silver, F.H., J.W. Freeman, and D. DeVore, Viscoelastic properties of human skin and processed dermis. Skin Research and Technology, 2001. 7(1): p. 18-23.

(56) References Cited

OTHER PUBLICATIONS

Tadesse et al., "Silicone based artificial for humanoid facial expressions" Electroactive Polymer Actuators and Devices (EAPAD) 2009, vol. 7287, 10 pages.
Technical Data Sheet for Moldstar 30, https://www.smooth-on.com/products/mold-star-30/ 5 pages, Accessed Nov. 28, 2016.
Tran, H., et al., In vivo characterization of the mechanical properties of human skin derived from MRI and indentation techniques. Computer methods in biomechanics and biomedical engineering, 2007. 10(6): p. 401-407.
Wang, Y., et al., Silicone-Based Tissue-Mimicking Phantom for Needle Insertion Simulation. Journal of Medical Devices, 2014. 8(2): p. 021001.
Yannas, I. and J.F. Burke, Design of an artificial skin. I. Basic design principles. Journal of biomedical materials research, 1980. 14(1): p. 65-81.

* cited by examiner

BIOFIDELIC CONDUCTIVE SKIN SIMULANT

CROSS-REFERENCE TO RELATED APPLICATION

This application claims the benefit of U.S. Provisional Application 62/548,151, filed Aug. 21, 2017, the contents of which are hereby incorporated in its entirety.

BACKGROUND

The skin is the outer protective covering of the human body with an average total area close to 20 square feet, and composed of three layers namely the epidermis (outermost soft layer), the dermis (middle layer), and hypodermis (inner most layer made of strong connective tissues), with an average thickness of 1-4 mm. The skin is the first point of contact for any external load with the human body, and also the first barrier against any physical injury.

Skin simulants have been developed for burnt skin replacements and for medical training, such as for phlebotomical and surgical practice. Skin simulants are also useful in a variety of design and testing applications. For instance, skin simulants are employed during the development of ballistic munitions, especially in the context of non-lethal projectiles.

A successful skin simulant should accurately mimic the biomechanical properties of natural skin. Skin is a viscoelastic material and exhibits non-linear strain behavior. Furthermore, skin is not homogenous across either a single individual or a group of individuals. A single human will have skin tissues of differing stiffness, thickness and, depending on the specific location the skin occurs on the human body. As skin ages, collagen and other cellular components degrade, leading the skin to become less stiff.

Historically, intact skin obtained from human cadavers has been employed as a simulant, as well as skin samples from animals such as pigs, goats, and sheep. However, these materials present both ethical and practical challenges stemming from the harvesting and storage of biological tissues. As such, the use of synthetic skin simulants has been explored. U.S. Pat. No. 7,222,525 discloses skin/tissue simulant prepared from a gelatin block overlaid with an ether-cast polyurethane sheet. WO 2013/171444 describes a skin simulant prepared from a synthetic chamois, which can be prepared from various polymeric materials such as cotton, viscose, polyvinyl acetate, polyesters, and nylon-polyamide. These simulants, however, do not truly mimic the non-linear hyperelastic properties of true human skin.

Despite extensive research, a skin simulant having the realistic non-linear hyperelastic properties of the human skin has not yet been achieved. Realistic skin simulants would be of great use in a variety of biomechanical testing applications. For instance, a realistic simulant could be used to estimate the load response of cosmetic implants, or to further study the mechanics of skin injuries.

It is also known that skin tissue is not uniform over an entire human body. A realistic conductive skin simulant would be an invaluable aid for developing surgical techniques, especially for vaginal and other unique tissue types. In vaginal prolapse (POP), tissue stiffens progressively, making it difficult for surgeons to correctly suture and implants corrective devices. Faulty vaginal mesh surgeries have caused substantial pain and suffering in many women, and have resulted in malpractice lawsuits cumulatively totaling over 100 million dollars annually. To date, training for urogynoecological surgeries is limited due to the limited availability of vaginal tissue. In addition to ethical and safety concerns associated with sampling human vaginal tissue, it is known that vaginal tissue obtained from a cadaver is not the same as living tissue. As such, efforts to develop improved urogynocological techniques have been hampered.

The development of non-lethal and less-lethal munitions is an active area of research in the ballistics industry. A simulant with realistic mechanical properties of the human skin is essential in order to accurately predict the lethality of such munitions prior to their deployment in the field. The compositions and methods disclosed herein address these and other needs.

Conductive polymer composites have been prepared in different forms in the last decade to advance research and testing of wearable technologies and for acquisition of biomechanical information from the human body. Various polymeric materials such as nitrile, butyl, and natural rubber, and ethylene-propylene-diene monomer (EPDM) are being widely used for the preparation of these type of composites. These polymer compounds are made conductive by the addition of conductive fillers such as carbon, metal powders, carbon nano tubes, graphene, graphite, and expanded graphite etc. Metal powders, as fillers, are required in high volume fractions to form the conducting network in the polymer matrix leading to the inhomogeneity of the composites thereby losing the processability. To date, no conductive polymer has been developed which can at the same time simulate an accurate human tissue behavior and conduct electricity.

Soft conductive polymers have been developed in the past with carbon and metal based filler materials to advance research and testing of wearable technologies and for acquisition of biomechanical information from the human body. However, none of these conductive materials are able to simulate human tissue behavior.

Thus, there remains a need for conductive synthetic skin simulants, which can precisely simulate the mechanical properties of the human skin. There remains a need for conductive skin simulants that are cost effective and have no handling or biosafety issues, thereby suitable for biomechanical testing in labs and clinics.

SUMMARY

In accordance with the purposes of the disclosed methods, as embodied and broadly described herein, the disclosed subject matter relates to compositions and methods of making and using the compositions. More specifically, according to the aspects illustrated herein, there are provided biofidelic conductive skin simulants and methods of making and using the biofidelic conductive skin simulants disclosed herein.

According to further aspects illustrated herein, biofidelic conductive skin simulants are provided. The disclosed biofidelic conductive skin simulants can comprise one or more crosslinked siloxane polymers, wherein the particular siloxane and degree of crosslinking are selected to produce a silicone network exhibiting the non-linear deformation properties of natural skin. Particularly disclosed herein are biofidelic conductive skin simulants closely mimicking normal and prolapsed vaginal skin tissue at a lower test rate. These simulants can be used to develop surgical techniques, including but not limited to those for prolapse surgery, hysterectomy, and surgeries associated with childbirth, such as cesarean section or episiotomy. Also disclosed herein are methods of making biofidelic conductive skin simulants.

The disclosed methods can comprise, for example, cross-linking (or curing) one or more siloxane polymers in the presence of conductive fibers in a manner sufficient to produce a silicone network exhibiting the non-linear viscoelastic properties of natural skin.

Additional advantages will be set forth in part in the description that follows or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

DETAILED DESCRIPTION

The methods and compositions described herein may be understood more readily by reference to the following detailed description of specific aspects of the disclosed subject matter and the Examples included therein.

Before the present methods and compositions are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

"Optional" or "optionally" means that the subsequently described event or circumstance can or cannot occur, and that the description includes instances where the event or circumstance occurs and instances where it does not.

It is understood that throughout this specification the identifiers "first" and "second" are used solely to aid the reader in distinguishing the various components, features, or steps of the disclosed subject matter. The identifiers "first" and "second" are not intended to imply any particular order, amount, preference, or importance to the components or steps modified by these terms.

By substantially the same is meant the values are within 5% of one another, e.g., within 3%, 2% or 1% of one another.

As used herein, the term "silicone rubber" refers to three-dimensional networks of cross-linked siloxane polymers. Unless specified otherwise, silicone rubbers include materials that are composed solely of crosslinked siloxane polymers, and materials that include other chemical compounds incorporated into the network. Such other chemical compounds can be covalently incorporated into the network, or can be incorporated into the network through non-covalent interactions (e.g., hydrogen bonds, electrostatic bonds, Van der Waal bonds and the like).

As used herein, the term "non-linear hyperelastic" describes a material in which some specified influence (such as stress) produces a response (such as strain or stretch) which is not proportional to the influence, and which can be characterized using constitutive curve fit equations known as the hyperelastic equations.

As used herein, the term "elasticity modulus (E) (low stretch ratio)" refers to the initial elasticity modulus or slope of the stress-stretch plot of a non-linear material approximated at low stretch values. The way to measure this is to draw a line starting at the origin and tangent to the stress-stretch plot, and numerically estimate its slope.

As used herein, the term "elasticity modulus (E) (high stretch ratio)" refers to the final elasticity modulus or slope of the stress-stretch plot of a non-linear material before rupture. The way to measure this is to draw a line starting at the point of rupture and tangent to the stress-stretch plot, and numerically estimate its slope.

As used herein, the term "ultimate tensile strength" refers to the value of stress applied to a material which just causes its rupture.

As used herein, the term "one-part siloxane" refers to a liquid siloxane composition which will undergo crosslinking in the absence of any added chemical reagent. Exemplary one-part siloxanes include those cured by heat, light, moisture, and combinations thereof. Some one-part siloxanes can undergo crosslinking when exposed to ambient conditions (~23° C., standard humidity), whereas others require additional energy inputs (such as light or elevated heat) in order to crosslink.

As used herein, the term "two-part siloxane (Part A)," or simply "siloxane (Part A)," refers to a liquid siloxane composition that contains a latent reactive silicone functional group that requires activation by the exposure to an additional chemical reagent.

As used herein, the term "two-part siloxane (Part B)," or simply "siloxane (Part B)," refers to a liquid siloxane composition that contains a chemical reagent that will activate a silicone functional group to crosslinking.

Crosslinked siloxane networks can be characterized according to the Shore (Durometer) hardness scale, as defined by the American Society for Testing and Materials (ATSM) D2240 testing standard. Shore (Durometer) hardness can be measured along several different scales, including "OO", "A," and "D". Conductive skin simulants can have, but are not limited to, networks having a Shore (Durometer) hardness from OO-10 to 30 A.

As used herein, the term "siloxane 00-10" refers to a liquid siloxane composition, which, when cured with another siloxane 00-10, will produce a silicone network having a Shore (Durometer) hardness of 00-10. One of ordinary skill will appreciate that when a siloxane (Part A) 30 A is combined with an equal amount of siloxane (Part B) 30 A, the resulting network will have a Shore (Durometer) hardness of 30 A. However, when two siloxanes of differing Shore (Durometer) hardness levels are combined, the resulting network will have a Shore hardness different (now including non-linear viscoelastic properties) than either of the precursor siloxane components.

Biofidelic Conductive Skin Simulant

The biofidelic conductive skin simulants disclosed herein have biomechanical properties similar to those of natural human skin. The biomechanical properties of human skin have been reported by Anniadh et al., in "Characterization of the anisotropic mechanical properties of excised human skin," JOURNAL OF THE MECHANICAL BEHAVIOR OF BIOMEDICAL MATERIALS (2012) 5:139-148, which is incorporated by reference herein in its entirety for its teaching of the mechanical properties of skin and methods of measuring those properties. Anniadh describes the non-linear hyperelastic properties of human skin. In some embodiments, the conductive skin simulants disclosed herein exhibit non-linear properties falling with the ranges provided by Anniadh for human skin.

Hyperelastic conductive skin simulants are characterized by an elasticity modulus (low stretch) that is lower than the corresponding elasticity modulus (high stretch).

In some embodiments, the conductive skin simulant can be characterized by an elasticity modulus (E) (low stretch ratio) of at least 2, 2.5, 3, 3.5, 4, 4.5, 5, 5.5, 6, 6.5, 7, 7.5, or 8 MPa, where any of the stated values can form an upper or lower endpoint of a range. In some embodiments, the conductive skin simulant can be characterized by an elasticity modulus (E) (low stretch ratio) of no more than 8, 7.5, 7, 6.5, 6, 5.5, 5, 4.5, 4, 3.5, 3, 2.5, or 2 MPa, where any of the stated values can form an upper or lower endpoint of a range. For instance, the elasticity modulus (E) (low stretch ratio) can be from 0.1-10, 0.25-8, 0.25-5, 1-8, 1-5, 2-8, 2-7.5, 2-7, 2-6.5, 2-6, 2-5.5, 2-5, 2-4.5, 2-4, 2-3.5, 2-3, 2-2.5, 7.5-8, 7-8, 6.5-8, 6-8, 5.5-8, 5-8, 4.5-8, 4-8, 3.5-8, 3-8, or 2.5-8 MPa. In some embodiments, the elasticity modulus (E) (low stretch ratio) can be from 4-8, 4-7.5, 4-7, 4-6.5, 4-6, 4-5.5, 4-5, 4-4.5, 7.5-8, 7-8, 6.5-8, 6-8, 5.5-8, 5-8, or 4.5-8 MPa.

The conductive skin simulant can be characterized by an elasticity modulus (E) (high stretch ratio) of at least 6, 13, 20, 27, 34, 41, 48, 55, 62, 69, 76, 83, or 90 MPa, where any of the stated values can form an upper or lower endpoint of a range. The conductive skin simulant can be characterized by an elasticity modulus (E) (high stretch ratio) of no more than 90, 83, 76, 69, 62, 55, 48, 41, 34, 27, 20, 13 or 6 MPa, where any of the stated values can form an upper or lower endpoint of a range. For instance, the elasticity modulus (E) (high stretch ratio) can be from 6-90, 6-83, 6-76, 6-69, 6-62, 6-55, 6-48, 6-41, 6-34, 6-27, 6-20, 6-13, 83-90, 76-90, 69-90, 62-90, 55-90, 48-90, 41-90, 34-90, 27-90, 20-90, or 13-90 MPa. In some embodiments, the elasticity modulus (E) (high stretch ratio) can be from 34-90, 34-83, 34-76, 34-69, 34-62, 34-55, 34-48, 34-41, 83-90, 76-90, 69-90, 62-90, 55-90, 48-90, or 41-90 MPa.

In certain embodiments, the conductive skin simulant can be characterized by an elasticity modulus (E) (low stretch ratio) from 2-8 MPa, and an elasticity modulus (E) (high stretch ratio) from 6-90 MPa, wherein the low stretch modulus is less than the high stretch modulus. In some embodiments, the conductive skin simulant can be characterized by an elasticity modulus (E) (low stretch ratio) from 4-8 MPa, and an elasticity modulus (E) (high stretch ratio) from 20-40 MPa.

The conductive skin simulant can be characterized by a variety of electrical resistances. For instance, the electrical resistance, in the un-stretched state, can be less than 1,000Ω, less than 900Ω, less than 800Ω, less than 700Ω, less than 600Ω, less than 500Ω, less than 400Ω, less than 300Ω, less than 200Ω, or less than 100Ω. In certain embodiments, when the conductive skin simulant is stretched to at least 100% elongation, at least 200% elongation, at least 300% elongation, at least 400% elongation, or at least 500% elongation, the electrical resistance is less than 1,000Ω, less than 900Ω, less than 800Ω, less than 700Ω, less than 600Ω, less than 500Ω, less than 400Ω, less than 300Ω, less than 200Ω, or less than 100Ω.

In certain embodiments, the electrical resistance is only increased by no more than 50%, no more than 25%, no more than 10%, no more than 5%, or no more than 1% when the conductive skin simulant is stretched to at least 100% elongation, at least 200% elongation, at least 300% elongation, at least 400% elongation, or at least 500% elongation.

In some embodiments, the conductive skin simulant can be a vaginal conductive skin simulant at a lower test rate. Prolapsed vaginal conductive skin simulants can be characterized by an elasticity modulus (E) (low stretch ratio) from 2-8, 2-7, 2-6, 2-5, 2-4, 2-3, 6-7, 5-7, 4-7, or 3-7 MPa. Prolapsed vaginal conductive skin simulants can be characterized by an elasticity modulus (E) (high stretch ratio) from 12-60, 12-24, 12-36, 12-48, 48-60, 36-60, or 24-60 MPa.

Normal vaginal conductive skin simulants can be characterized by an elasticity modulus (E) (low stretch ratio) from 0.3-2.7, 0.3-2.4, 0.3-2.1, 0.3-1.8, 0.3-1.5, 0.3-1.2, 0.3-0.9, 0.3-0.6, 2.4-2.7, 2.1-2.7, 1.8-2.7, 1.5-2.7, 1.2-2.7, 0.9-2.7, or 0.6-2.7 MPa. Normal vaginal conductive skin simulants can be characterized by an elasticity modulus (E) (high stretch ratio) from 3-12, 3-9, 3-6, 9-12, or 6-12 MPa.

The conductive skin simulant can be characterized by an ultimate tensile strength of at least 1, 2, 3, 4, 5, 6, 7, 8, 9, 10, 15, 20, or 25 MPa, where any of the stated values can form an upper or lower endpoint of a range. The conductive skin simulant can be characterized by an ultimate tensile strength no greater than 25, 20, 15, 10, 9, 8, 7, 6, 5, 4, 3, 2, or 1 MPa, where any of the stated values can form an upper or lower endpoint of a range. The ultimate tensile strength can be from 1-25, 1-20, 1-15, 1-10, 1-9, 1-8, 1-7, 1-6, 1-5, 1-4, 1-3, 1-2, 20-25, 15-25, 10-25, 9-25, 8-25, 7-25, 6-25, 5-25, 4-25, 3-25, or 2-25 MPa. In some embodiments, the ultimate tensile strength can be from 5-20, 5-15, 5-10, 10-15, 15-20, 15-25, or 20-25 MPa.

Figure 1:
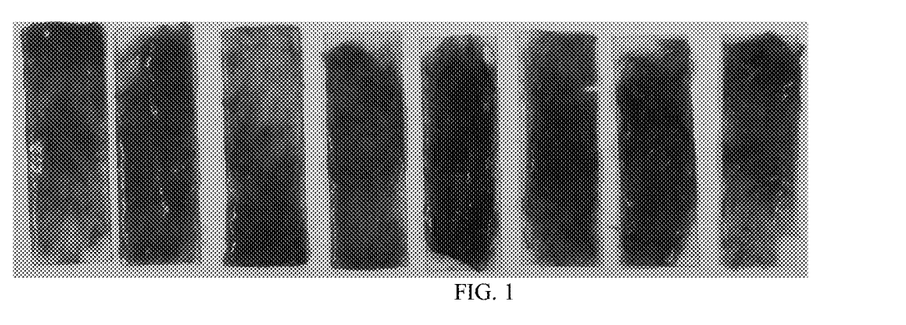
FIG. 1 depicts various conductive skin simulants.

Hyperelastic constitutive equations are able to precisely curve fit the non-linear stress versus stretch behavior of soft tissues such as the human skin. Veronda-Westmann hyperelastic stress and stretch relationship for curve fitting an isotropic uniaxial mechanical test data is given by equation (1), and the following table gives the curve fit parameters for all the 23 conductive skin simulant samples tested. Samples 16, 17, 18, 20, 21 and 22 are shown in FIG. 1, Panel B.

$$\sigma_{Veronda-Westmann} = 2\left(\lambda^2 - \frac{1}{\lambda}\right)c_1 c_2 \left(e^{c_2(I_1 - 3)} - \frac{1}{2\lambda}\right) \quad (1)$$

| Sample | Veronda-Westmann Hyperelastic model coefficients | |
|---|---|---|
| | $c_1$ | $c_2$ |
| 1 | 1.1 | 0.23 |
| 2 | 1 | 0.2 |
| 3 | 5.9 | 0.28 |
| 4 | 3.4 | 0.25 |
| 5 | 2.3 | 0.27 |
| 6 | 4 | 0.26 |
| 7 | 6 | 0.32 |
| 8 | 5.8 | 0.3 |
| 9 | 6.5 | 0.29 |
| 10 | 5.4 | 0.27 |
| 11 | 5.2 | 0.26 |
| 12 | 1.5 | 0.25 |
| 13 | 2 | 0.3 |
| 14 | 5 | 0.25 |
| 15 | 11.8 | 0.2 |
| 16 | 16 | 0.22 |
| 17 | 35 | 0.33 |
| 18 | 18 | 0.23 |
| 19 | 11.5 | 0.21 |
| 20 | 13.7 | 0.21 |
| 21 | 28 | 0.3 |
| 22 | 24 | 0.28 |
| 23 | 13.1 | 0.21 |

The conductive skin simulants disclosed herein can include one or more crosslinked siloxane networks. Suitable siloxane polymers for incorporation into the network include those giving rise to silicone rubbers having a Shore (Durometer) hardness from 00-0 to 40 A, including 00-0, 00-10, 00-20, 00-30, 00-40, 00-50, 00-60, 10 A, 20 A, 30 A, and 40 A. However, other siloxanes, for instance those which, when cured alone, result in more rigid elastomers, can also be incorporated into the conductive skin simulant.

The conductive skin simulants disclosed herein comprise silicone rubber. Silicone rubber is an elastomeric network of crosslinked siloxane polymers. Some silicone rubbers are characterized as "one-part," whereas others are referred to as "two-part." One and two-part silicone rubbers are distinguished based on how they are prepared. One part silicone rubbers are obtained by curing a single liquid siloxane precursor. Crosslinking such one-part systems can occur in the presence of air, light, and/or heat. Two-part silicone rubbers are prepared by combining two separate siloxane liquids. Each part contains a reactive component which, when combined, participates in a crosslinking reacting. Two-part silicone systems include addition-cured rubbers such as platinum cure rubbers, condensation-cured rubbers such as tin-cured rubbers, and peroxide-cured rubbers. The individual components of a two-part silicone rubber are often designated "Part A" and "Part B." As used herein, Part A is considered the hardener component, and Part B contains the crosslinker (such as the platinum catalyst).

In certain embodiments, the conductive skin simulants disclosed herein are made from a single one-part or two-part siloxane. Such simulants are designated herein as "monophasic silicone simulants." In other embodiments, the conductive skin simulant is made from two different one-part or two-part siloxanes. Such simulants are designated herein as "biphasic silicone simulants." Higher order systems, such as ternary or quaternary refer to systems made from three, or four, different siloxanes (one-part or two-part), respectively, can also be employed.

In certain embodiments, the conductive skin simulant can be a monophasic silicone system, having a Shore hardness of 00-0, 00-10, 00-15, 00-20, 00-30, 00-40, 00-50, 10 A, 20 A, 30 A, 40 A, or 50 A.

In some embodiments, the conductive skin simulant is a blend of at least one siloxane having a Shore hardness from 00-0 to 00-15, and a second siloxane having a Shore hardness from 10 A to 40 A. In some embodiments, the first siloxane has a Shore hardness from 00-05 to 00-15 and the second siloxane has a Shore hardness from 20 A to 30 A. In certain examples, the first siloxane has a Shore hardness of 00-10 and the second siloxane has a Shore hardness of 30 A.

Depending on the specific conductive skin simulants required, the first and second siloxane can be present in a ratio from 1:99 to 99:1 by weight of the total silicone rubber. When either the first or second is a two part silicone system, the ratio includes the sum of both Parts A and B. The first siloxane, having a Shore hardness from 00-05 to 00-15, can be present in an amount that is no more than 50%, 40%, 30% 20%, 15%, 12%, 10%, 8%, 6%, 4%, or 2% by weight of the total siloxane content. The second siloxane, having a Shore hardness from 20 A or 30 A, preferably 30 A, can be present in an amount that is at least 50%, 60%, 70%, 80%, 85%, 88%, 90%, 92%, 94%, 96%, or 98% by weight of the total siloxane rubber content.

In other examples, conductive skin simulants having a different spectrum of properties can be obtained by blending a first siloxane, having a Shore hardness from 00-05 to 00-15, in an amount that is at least 50%, 55%, 60%, 65%, 70%, 75%, or 80% by weight of the total siloxane content. The second siloxane, having a Shore hardness from 20 A to 30 A, preferably 30 A, can be present in an amount no more than 50%, 45%, 40%, 35%, 30%, 25%, or 20% by weight of the total siloxane content.

In some examples, the conductive skin simulants, including those mimicking the vaginal conductive skin simulants at a lower strain rate, can be obtained by blending a first siloxane having a Shore hardness of 00-10 and a second siloxane having a Shore hardness of 30 A. The first and second siloxanes can be mixed together in a weight ratio from 25:75 to 35:65, or 27.5:72:5 to 32.5:67.5, or 29:71 to 31:69. In certain selected embodiments, the first and second siloxanes can be mixed together in a weight ratio from 35:65 to 40:60, or 35:65 to 37.5:62.5, or 37.5:62.5 to 40:60, or 32.5:67.5 to 35:65. In some embodiments, the first siloxane has a Shore hardness of 00-10 and is present in an amount that is 10-50% by weight, and the second siloxane has a Shore hardness of 30 A, and is present in an amount that is from 50-90% by weight. In other embodiments, the first siloxane has a Shore hardness of 00-10 and is present in an amount that is 10% by weight, and the second siloxane has a Shore hardness of 30 A, and is present in an amount that is 90% by weight When the first or second siloxane is a two-part siloxane, the two parts may be present in equal proportions, or in different amounts. For instance, a greater amount of the first siloxane Part A can be blended with a lesser amount of the first siloxane Part B, or a lesser amount of the first siloxane Part A can be blended with a greater amount of the first siloxane Part B. The same is true for the second siloxane, for instance, a greater amount of the second siloxane Part A can be blended with a lesser amount of the second siloxane Part B, or a lesser amount of the second siloxane Part A can be blended with a greater amount of the second siloxane Part B.

In certain embodiments including 2-part silicone systems, it is preferred that the Part A component (i.e., the part that does not contain the crosslinking initiator) is present in a greater amount by weight that the Part B component (i.e., the part that does contain the crosslinking initiator). In other embodiments, it is preferred that the Part A component (i.e., the part that does not contain the crosslinking initiator) is present in a less amount by weight than the Part B component (i.e., the part that does contain the crosslinking initiator).

Exemplary compositions (% by weight) can be prepared in the following ratios:

|   | 00-05; 00-10; or 00-15 | | 20A or 30A | |
|---|---|---|---|---|
| # | Part A | Part B | Part A | Part B |
| 1 | 1-5 | 5-10 | 50-93 | 1-44 |
| 2 | 5-10 | 1-5 | 50-93 | 1-44 |
| 3 | 1-5 | 5-10 | 1-44 | 50-93 |
| 4 | 5-10 | 1-5 | 1-44 | 50-93 |
| 5 | 1-10 | 1-10 | 25-73 | 25-73 |
| 6 | 1-5 | 5-10 | 25-69 | 25-69 |
| 7 | 5-10 | 1-5 | 25-69 | 25-69 |

In some cases, the conductive skin simulant can be obtained from a blending two part 00-10 siloxane components, in which the Part A is present in greater weight than Part B, with two part 30 A siloxane components, in which the Part A is present in greater weight than Part B.

The conductive skin simulants contain conductive fibers dispersed therein. Exemplary fibers include carbon fibers, conductive polymers, metals, and combinations thereof. In some cases, at least 75%, at least 80%, at least 85%, at least 90%, at least 95%, at least 97.5%, or at least 99% of the fibers can have a length of from 1-10 mm, 2-9 mm, 3-8 mm, 4-8 mm, or 4-7 mm. Preferably, at least 75%, at least 80%, at least 85%, at least 90%/a, at least 95%, at least 97.5%, or at least 99% of the fibers can have a length of 5±0.5 mm.

The conductive fibers can be present in an amount of at least 15%, 25%, 35%, 45%, 50%, 60%, 70%, 80% or 90%, by weight relative to the total weight of the simulant. Such fractions can be designated Fiber Weight Fraction (FWF). Different FWF will give different electrical resistances at different elongations. For instance, at a FWF from 0.25 to 0.5 (i.e., 0.25, 0.3, 0.35, 0.4, 0.45, 0.5), the electrical resistance is less than 1,000Ω, less than 900Ω, less than 800Ω, less than 700Ω, less than 600Ω, less than 500Ω, less than 400Ω, less than 300Ω, less than 200Ω, or less than 100 Ω when the simulant is at rest (i.e., unstretched). For instance, at a FWF from 0.5 to 0.75 (i.e., 0.5, 0.55, 0.6, 0.65, 0.7, 0.75), the electrical resistance is less than 1,000Ω, less than 900Ω, less than 800Ω, less than 700Ω, less than 600Ω, less than 500Ω, less than 400Ω, less than 300Ω, less than 200Ω, or less than 100 Ω when the simulant is stretched 100%. At a FWF from 0.75 to 0.95 (i.e., 0.75, 0.80, 0.85, 0.90, 0.95), the electrical resistance is less than 1,000Ω, less than 900Ω, less than 800Ω, less than 700Ω, less than 600Ω, less than 500Ω, less than 400Ω, less than 300Ω, less than 200Ω, or less than 100 Ω when the simulant is stretched 200%. Such systems can have a final Shore hardness of 00-10, 00-15, 00-20, 00-25, 00-30, 5 A, 10 A, 20 A or 30 A.

Other components can be incorporated into the conductive skin simulants. For instance, oils can be added to modify the overall stiffness of the simulant, and dyes can be included to produce simulants of differing colors.

Conductive skin simulants can be prepared by combining one or more liquid siloxanes, as well as any additional ingredients, in a mold and allowing them to cure. Generally, all the siloxanes should be well blended to ensure a uniform simulant. In other embodiments, however, a layered simulant can be prepared by sequentially curing different siloxane mixtures in a mold.

The conductive skin simulants disclosed herein can be employed in a wide variety of testing applications. For instance, real life injury scenarios can be recreated using a human skin surrogate and personal protective equipment (PPE) and safety systems in a wide range of applications, including military, automotive, biomedical, security, sports equipment etc. The conductive skin simulant can be used for extensive testing on the load response of the implants on the skin as well as for developing lighter and more reliable implant technologies in the future. The conductive skin simulant material can also be used to design human torsos for estimating the dynamic load response of ballistics for development of non-lethal and less-lethal ballistic munitions in the future. Additionally, in the field of ergonomics, this human conductive skin simulant can help estimate the discomfort level in individuals at different working conditions (such as a hard seat at work, loose car steering or a tight fitting dress of a swimmer).

In some embodiments, conductive skin simulants can be incorporated into a patient simulator. The patient simulator can be a complete human body, for instance, a crash test dummy. The manikin can be a partial body, for instance a torso, leg, pelvic region, and the like. In some embodiments the patient simulator can include a plurality of different conductive skin simulants, mimicking natural skin as it occurs in the corresponding location of human anatomy.

The examples below are intended to further illustrate certain aspects of the methods and compounds described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

To develop the skin like conductive polymers, two-part silicones, with Shore (Durometer) hardness (American Society for Testing and Materials (ATSM) D2240 testing standard) of 30 A and 00-10 respectively procured from Smooth-On Inc. and Polytek Inc. was used. A mold was designed in a CAD software (Solidworks Inc.) with 30 coupons of 5 cm length, 1 cm width and 3 mm depth. The design was 3D printed at the University of Alabama 3D printing lab using a Stratasys Dimension SST 1200es 3D printer.

The synthetic skin composition used for the matrix material throughout the study was 45% wt. Shore 30 A (part A-hardener), 45% wt. Shore 30 A (part B-cross linker), 5% wt. Shore 00-10 (part A-hardener) and 5% wt. Shore 00-10 (part B-cross linker). From a spool of carbon fibers, fibers bundles were chopped in different lengths (0.5-6 mm) and mixed in different weights fractions (FWF's) with the synthetic skin material to generate the test coupons. A microscope (Serial No. 29AX E250223 from Motic Inc.) was used to capture images of the test coupons with low and high FWF's before mechanical testing. A uniaxial test was conducted (on a MTS universal testing machine) to study the load versus deformation behavior of the test specimens. Several considerations were taken while testing the test coupons. A constant strain rate of 0.4 s-1 and specimen size of 35 mm×10 mm×3 mm (after clamping) was selected for all the uniaxial tests on silicone based material, based on literature on uniaxial tests on human skin. A very small initial load (<0.1 N) was applied on each test specimen to ensure there is no slack in the specimen to start with.

Figure 4:
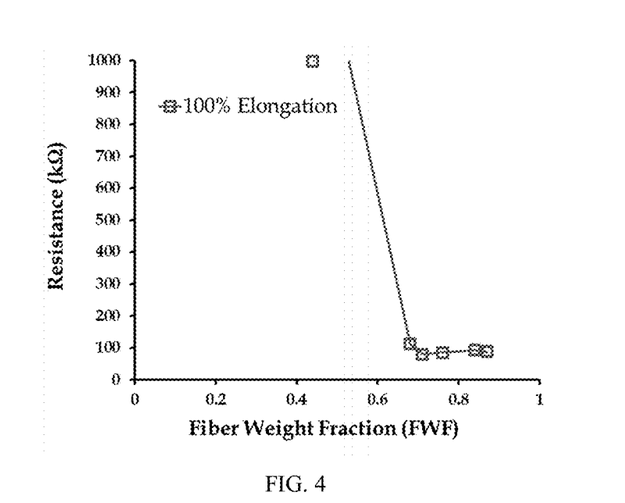
FIG. 4 depicts FWF versus resistances recorded at 1 cm spacing 100% elongation.

Accompanying the complete uniaxial tensile testing of each coupon at varying strains, all test coupons were stretched to 100% elongation (strain of 1) and 200% elongation (strain of 2) and the respective electrical resistances were recorded at 1 cm and 5 cm spacing. Two MANNIX digital multimeters (Sr. no. DMM51FSG) were used which can measure resistances in the range of 200Ω to 200 MΩ. The power source for the instrument is a 9 volt internal battery. Two multimeters were used to double check the accuracy of the measurements at all times and to calibrate the instrument in cases of possible errors. The resistance changes due to varying FWF's were thoroughly characterized for stretched coupons at unstretched, and at 100% and 200% elongation states. Also, for different strains, the FWF values which would result in a small resistance value (<1000Ω) were identified to understand composite material model requirements for a highly flexible synthetic skin composition with a consistent conducting path. FIG. 4 shows the resistance measurements being conducted at 5 cm spacing for the coupon at 100% elongation, and a representative microscopic image of the fiber alignment in a section of the coupon. Various considerations were made to collect accurate resistance data points. First, two pins were used to hook the multimeter wires and to obtain a stable resistance reading. Second, the 1 cm and 5 cm spacing resistances were measured at two different locations on the coupon for each test, and the average values of the resistances were reported. Third, the percentage elongation was controlled via the tensile testing machine to ensure accuracy, and the tensile test was stopped temporarily for about a minute to record stable resistance readings.

Figure 2:
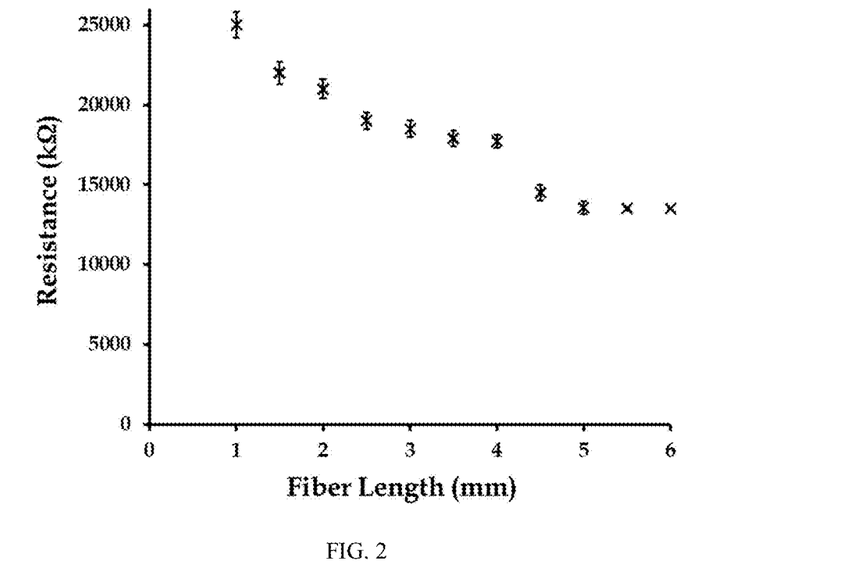
FIG. 2 depicts a correlation between conductive fiber length and resistance (kΩ).

The fiber lengths and FWF were varied initially to understand the fiber requirements for a consistent electrical conduction through the synthetic skin material. At a FWF of 0.15, the coupons started to show a reasonable amount of conduction (Resistance<15000Ω). To understand the optimal fiber length for the highest conduction (lowest resistance) in the composite, 10 coupons were generated with FWF of 0.15±0.05 and different fiber lengths. The resulting resistance at a 1 cm spacing were recorded at two different locations on each coupon. The average values of the resistances with error bars for different fiber lengths at 1 cm spacing are presented in FIG. 2.

Microscopy images were captured to look at fiber alignments in the coupons with different fiber lengths. It was found that for fiber lengths in the range of 0.5-3 mm, fiber agglomeration took place forming fiber bundles, and resulting in fewer fiber crosslinks (see FIG. 6A for a fiber length of 2 mm). This could possibly explain the high resistances indicated in FIG. 5 for this range of fiber lengths. For fiber lengths L>3 mm, the fiber agglomeration was observed to be reduced and result in an observable increase in the number of crosslinks (see FIG. 6B for a fiber length of 5 mm). At a fiber length of approximately 5±0.5 mm and going from fiber lengths of 5 to 7 mm, the resistance value recorded was consistent in the range of 13536-13578Ω. Thereby, 5±0.5 mm fiber length was considered as the optimum fiber length for the study.

Figure 3:
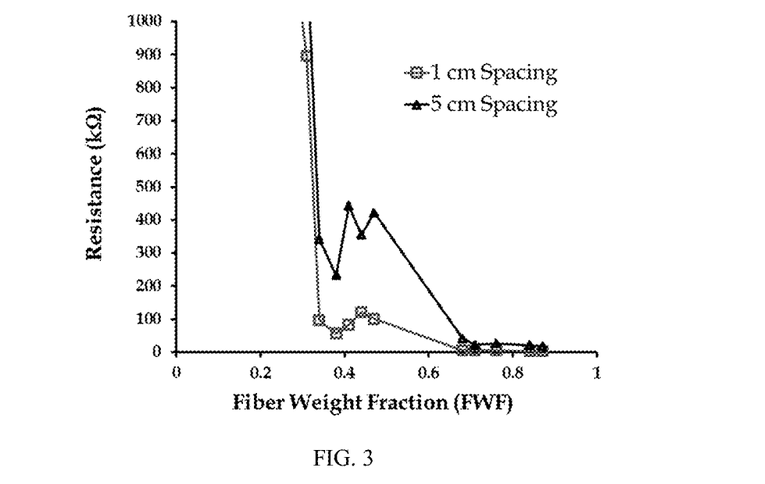
FIG. 3 depicts fiber weight fraction (FWF) versus resistances recorded at 1 cm and 5 cm spacing for test coupons in unstretched state.

Keeping the fiber length constant (5±0.5 mm), multiple test coupons (30) were generated with different FWF's. Going from a FWF of 0.15 to 0.9, it was found that for a FWF>0.3, the resistance was less than 1000Ω which is a reasonable number for a consistent conduction pathway in electronic devices. FIG. 3 presents the summary of resistances recorded for different FWF's at a spacing of 1 cm and 5 cm respectively. The sharp drop in resistances can be clearly seen beyond FWF of 0.3.

Figure 7:
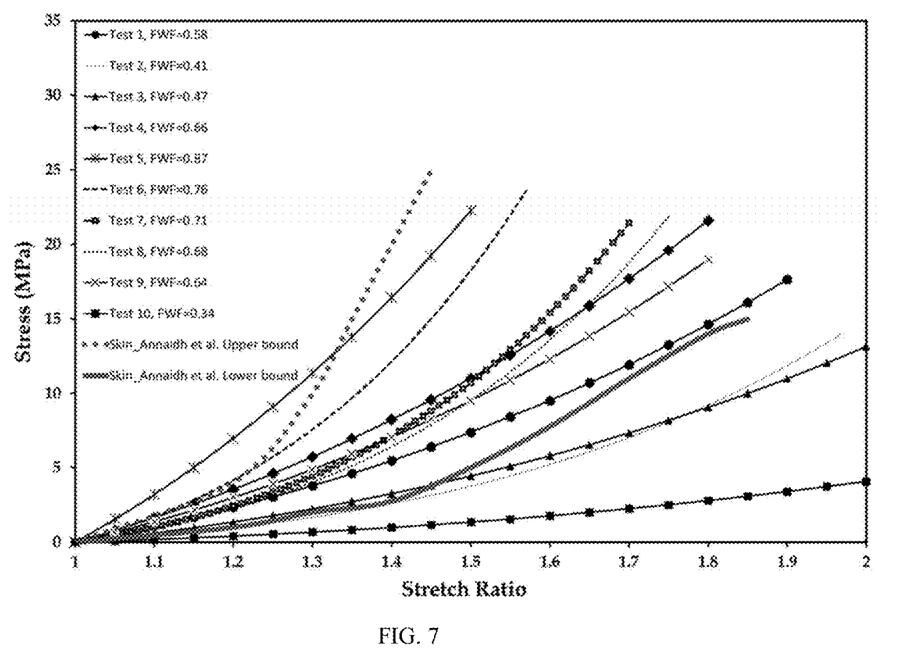
FIG. 7 depicts stress versus stretch behavior of conductive synthetic skin composites with different FWF's, within the bounds of literature based excised skin tissue properties

To characterize the current anisotropic composite material model developed for conductive synthetic skin, 30 test specimens were fabricated with the same matrix material and varying FWF's. Based on the uniaxial mechanical tests, the stress versus stretch responses of 10 composite compositions with different FWF's are presented in FIG. 7. FIG. 7 also shows the literature plots on mechanical tests on excised human skin (upper and lower bounds).

All the test coupons with different FWF's were subjected to 100% and 200% elongations and the resistances were measured at 1 cm spacing. It was found that there was an observed overall increase in resistance values due to elongation (FIG. 4). FIG. 4 captures the values of FWF which lead to resistance values<1000Ω. For FWF>0.65, a high conduction was recorded (with resistance<100Ω). This FWF value was much higher than the FWF>0.3 value reported for high conduction (Resistance<100Ω) in unstretched coupons (see FIG. 7).

Figure 5:
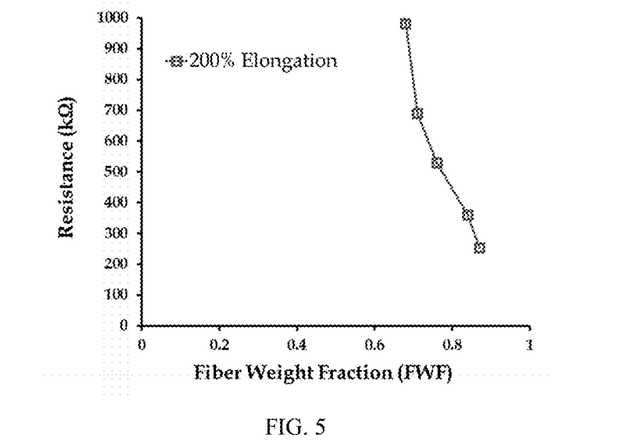
FIG. 5 depicts FWF versus resistances recorded at 1 cm spacing 200% elongation.
Figure 6:
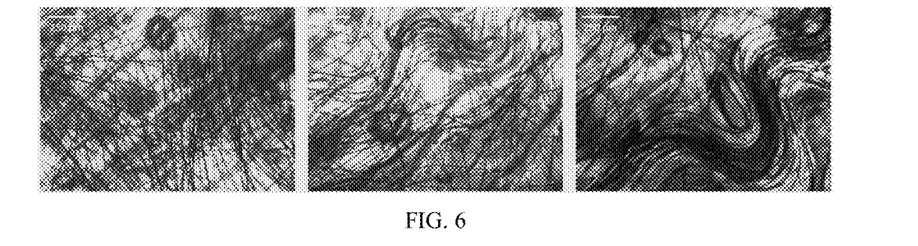
FIG. 6 depicts microscopy images of test coupon with FWF=0.47 in the unstretched state (Panel A), 100% elongation (Panel B) and 200% elongation (Panel C), showing fiber curling.

For the 200% elongation state, there was an observed overall increase in resistance values over the 100% elongation and unstretched states (FIG. 5). Looking at the FWF values which resulted in resistances<1000Ω, high conduction (resistance values<100Ω) were recorded for FWF>0.8, which is much higher than the FWF values required to produce high conduction (resistance values<100Ω) with the coupons at unstretched state and at 100% elongation. It can be concluded that stretching of the developed conductive synthetic skin material decreases its conductivity. Therefore, for applications which require minimum elongation, fiber inclusions with a small FWF will suffice. However, for high stretch conditions, a higher FWF is required to allow an unobstructed electrical conduction.

Microscopy was conducted to look at the changes in fiber alignment with varying strains. FIG. 6A captures the fiber alignment of one of the test coupons with FWF of 0.47 in unstretched state. FIGS. 6B and 6C shows the curling of fibers due to 100% and 200% elongations respectively captured after relaxation of the test specimen. Three main observations were recorded. First, strains lead to permanent curling of short carbon fibers within the matrix, giving rise to significant residual stresses within the composite especially at high strains. Second, the mechanical properties of the composite changes minimally due to the fiber curling, which was confirmed by comparison of the stress-strain plots of the test specimen tested multiple times. Third, the electrical properties of the composite material changes not only due to strains but also after stress relaxation. For the particular specimen with FWF of 0.47, before relaxation, the resistances recorded for unstretched state, at 100% and 200% elongation were 101 Ω, 422Ω and 1341Ω respectively. After relaxation, and three repeatability tests, the average values for unstretched state, at 100% and 200% elongation were calculated to be 394 Ω, 513Ω and 1477Ω respectively.

Based on the uniaxial mechanical tests conducted, the stress versus stretch plots in FIG. 7 of the composite test specimens with different FWF compositions were curve fitted using the Mooney-Rivlin, Yeoh, Veronda-Westmann and Humphrey hyperelastic material models.

The accuracy for prediction of non-linear anisotropic behavior of composite compositions was estimated for each hyperelastic model through numerical estimation of average R2 corellation index in each case. Table 3 summarizes the R2 corellation values which falls within 0.95<R2<1. The highest corellation index of (R2=0.988) was generated by the three parameter Yeoh's hyperelastic model. Veronda-Westmann's model fitting generated a similarly close curve fitting with (R2=0.985). The least (R2=0.962) was reported for the Mooney-Rivlin model.

The methods and compositions of the appended claims are not limited in scope by the specific methods and compositions described herein, which are intended as illustrations of a few aspects of the claims and any methods and compositions that are functionally equivalent are within the scope of this disclosure. Various modifications of the methods and compositions in addition to those shown and described herein are intended to fall within the scope of the appended claims. Further, while only certain representative methods, compositions, and aspects of these methods and compositions are specifically described, other methods and compositions and combinations of various features of the methods and compositions are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated.

What is claimed is:

1. A biofidelic conductive skin simulant comprising a crosslinked siloxane network with a conductive material dispersed therein, wherein the biofidelic conductive skin simulant has a tensile strength from 1 to 30 MPa; and an elasticity modulus (E) (low stretch ratio) from 2 to 8 and an elasticity modulus (E) (high stretch ratio) from 6 to 90 MPa, wherein the low stretch elasticity modulus is less than the high stretch elasticity modulus;
wherein the crosslinked siloxane network comprises a first siloxane having a Shore Hardness of from 00-0 to 00-60, and a second siloxane having a Shore Hardness of from 10 A to 40 A; and
wherein the conductive material is present in an amount of at least 25% by weight relative to the total weight of the biofidelic conductive skin simulant.

2. The biofidelic conductive skin simulant according to claim 1, wherein the crosslinked siloxane network comprises a siloxane having a Shore hardness from 00-10 to 40 A.

3. The biofidelic conductive skin simulant according to claim 1, wherein the first siloxane has a Shore Hardness of 00-0, 00-05, 00-10, or 00-15.

4. The biofidelic conductive skin simulant according to claim 1, wherein the second siloxane has a Shore Hardness of 20 A, 30 A, or 40 A.

5. The biofidelic conductive skin simulant according to claim 1, wherein the first siloxane is present in an amount of 2-20% by weight relative to the total weight of the crosslinked siloxane network.

6. The biofidelic conductive skin simulant according to claim 1, wherein the first siloxane is present in an amount of 80-98% by weight relative to the total weight of the crosslinked siloxane network.

7. The biofidelic conductive skin simulant according to claim 1, wherein the conductive material is present in an amount of 50-75% by weight relative to the total weight of the biofidelic conductive skin simulant.

8. The biofidelic conductive skin simulant according to claim 1, wherein the conductive material comprises fibers comprising carbon, conductive polymers, metal, or a combination thereof.

9. The biofidelic conductive skin simulant according to claim 8, wherein at least 75% of the conductive material are fibers having a length of from 4-7 mm.

10. The biofidelic conductive skin simulant according to claim 1, having an electrical resistance of less than 1,000Ω, less than 900Ω, less than 800Ω, less than 700Ω, less than 600Ω, less than 500Ω, less than 400Ω, less than 300Ω, less than 200Ω, or less than 100Ω.

* * * * *